US009397855B2

(12) United States Patent
Borgeson et al.

(10) Patent No.: US 9,397,855 B2
(45) Date of Patent: Jul. 19, 2016

(54) COMMUNICATIONS UNIT FOR AN INDUSTRIAL PROCESS NETWORK

(71) Applicant: Rosemount Inc., Chanhassen, MN (US)

(72) Inventors: Dale Warren Borgeson, Minneapolis, MN (US); Gabriel Assaad Maalouf, New Brighton, MN (US); Roger Rob Benson, Eden Prairie, MN (US); Carro Lynel Boyd, Golden Valley, MN (US)

(73) Assignee: Rosemount Inc., Shakopee, MN (US)

( * ) Notice: Subject to any disclaimer, the term of this patent is extended or adjusted under 35 U.S.C. 154(b) by 201 days.

(21) Appl. No.: 14/208,755

(22) Filed: Mar. 13, 2014

(65) Prior Publication Data
US 2014/0269764 A1 Sep. 18, 2014

Related U.S. Application Data

(60) Provisional application No. 61/781,348, filed on Mar. 14, 2013.

(51) Int. Cl.
*H04L 12/28* (2006.01)
*H04L 12/40* (2006.01)
*G06F 13/42* (2006.01)

(52) U.S. Cl.
CPC ...... *H04L 12/40006* (2013.01); *G06F 13/4282* (2013.01); *H04L 2012/4026* (2013.01)

(58) Field of Classification Search
None
See application file for complete search history.

(56) References Cited

U.S. PATENT DOCUMENTS

| 5,828,901 | A | 10/1998 | O'Toole et al. |
| 6,947,438 | B1 * | 9/2005 | Chang et al. ............... 370/419 |
| 7,643,480 | B2 | 1/2010 | Liu et al. |
| 8,112,565 | B2 * | 2/2012 | Russell et al. ............... 710/62 |
| 8,656,065 | B1 * | 2/2014 | Gerhart et al. .............. 710/14 |
| 8,798,084 | B2 * | 8/2014 | Pratt, Jr. .............. G01D 21/00 370/406 |
| 2004/0184517 | A1 * | 9/2004 | Westfield ............. G01D 3/08 375/219 |
| 2006/0290328 | A1 * | 12/2006 | Orth .......................... 323/218 |
| 2008/0151973 | A1 * | 6/2008 | Calvin ........................ 375/216 |
| 2008/0307122 | A1 | 12/2008 | Butler et al. |
| 2009/0072994 | A1 * | 3/2009 | Kleven ............... G01D 21/00 340/870.05 |
| 2009/0168857 | A1 * | 7/2009 | Golborne et al. ............ 375/223 |
| 2010/0046545 | A1 | 2/2010 | Kagan et al. |
| 2010/0274927 | A1 * | 10/2010 | Bobrek .................... 709/250 |
| 2010/0284485 | A1 * | 11/2010 | Calvin ............... G01D 21/00 375/272 |
| 2011/0164551 | A1 * | 7/2011 | Takebe ................. H04L 47/10 370/315 |
| 2012/0120966 | A1 | 5/2012 | Balasubramanian et al. |
| 2013/0191597 | A1 * | 7/2013 | Washiro .................... 711/123 |
| 2015/0378960 | A1 * | 12/2015 | Huffman ............... G06F 3/00 710/300 |

OTHER PUBLICATIONS

The International Search Report mailed Aug. 8, 2014 for International Application No. PCT/US2014/025945.

* cited by examiner

*Primary Examiner* — Phirin Sam
(74) *Attorney, Agent, or Firm* — Kinney & Lange, P.A.

(57) ABSTRACT

A field device is configured to send and receive data over an industrial process network. The field device includes a processor and a communications unit communicatively connected to the industrial process network. The communications unit is configured to send and receive the data over the industrial process network via a first communications protocol at a first data rate. The communications unit is connected to communicate with the processor via a second communications protocol at a second data rate that is greater than the first data rate.

21 Claims, 3 Drawing Sheets

COMMUNICATIONS UNIT FOR AN INDUSTRIAL PROCESS NETWORK

CROSS-REFERENCE TO RELATED APPLICATION

This application claims priority to U.S. Provisional Application No. 61/781,348, filed on Mar. 14, 2013, and entitled "MODEM ASIC ARCHITECTURE FOR HART COMMUNICATIONS PROTOCOL," the entire contents of which is hereby incorporated by reference.

BACKGROUND

This disclosure relates generally to field devices for use in industrial process networks. More particularly, the present disclosure relates to message processing and data transfer using communications units of a field device.

In a typical industrial plant, a distributed control system (DCS) is used to control many of the industrial processes performed at the plant. Typically, the plant has a centralized control room having a computer system with user input/output (I/O), disc I/O, and other peripherals. Coupled to the computing system are a controller and a process I/O subsystem.

The process I/O subsystem includes I/O ports which are connected to various field devices throughout the plant. Field devices include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights. The term "field device" encompasses these devices, as well as any other device that performs a function in a distributed control system.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 milliamps running through the loop. An analog field device that transmits a signal to the control room modulates the current running through the current loop, with the current proportional to the sensed process variable. On the other hand, an analog field device that performs an action under control of the control room is controlled by the magnitude of the current through the loop, which is modulated by the I/O port of the process I/O system, which in turn is controlled by the controller. Traditional two-wire analog devices having active electronics can also receive up to 40 milliwatts of power from the loop. Analog field devices requiring more power are typically connected to the control room using four wires, with two of the wires delivering power to the device. Such devices are known in the art as four-wire devices and are not power limited, as are two-wire devices.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve between an open and closed position, inclusive, based on the magnitude of the current flowing through the two-wire twisted pair.

More recently, hybrid systems that superimpose digital data on the current loop have been used in distributed control systems. One hybrid system is known in the control art as the Highway Addressable Remote Transducer (HART) and is similar to the Bell 202 modem specification. The HART system uses a half-duplex master-slave protocol. Typically, the master sends a command and expects a reply. In a complementary manner, the slave typically waits for a command and sends a reply in response. Each command or reply can be considered a message, varying in length from a few bytes to as many as 269 bytes. The message consists of asynchronous serial data transmitted at 1,200 bits per second (BPS). Transmission is accomplished through frequency-shift-keying (FSK), such that a logical 1 is represented by a 1,200 Hertz (Hz) signal and a logical 0 is represented by a 2,200 Hz signal. These HART protocol signals are modulated onto the two-wire communications line carrying the D.C. power.

Using the HART communication protocol, a message transaction is initiated by the central or control station sending a command to a specified field device, usually by addressing the field device with a unique address. The command may, for example, direct the field device to reply with information as to its status, such as current pressure sensed, or other status information. Upon receipt of the command from the control station, the field device sends a reply to the control station which is received and processed. The HART system permits the control station to conduct approximately two or three transactions per second. Accordingly, the HART protocol, while enabling such digital messages to be transmitted over the analog medium, can be relatively slow to send and receive such messages. The data rate of incoming and outgoing HART messages can require the processor to service such messages in intervals to avoid excessive delays of other high priority tasks of the processor. This, in turn, can require multiple interrupts of the processor per message, thereby increasing task-switching and other loads on the processor and increasing the complexity of implementing the communications protocol on the processor.

SUMMARY

In one example, a field device is configured to send and receive data over an industrial process network. The field device includes a processor and a communications unit communicatively connected to the industrial process network. The communications unit is configured to send and receive the data over the industrial process network via a first communications protocol at a first data rate. The communications unit is connected to communicate with the processor via a second communications protocol at a second data rate that is greater than the first data rate.

In another example, a communications unit is configured to send and receive data over an industrial process network. The communications unit includes a first communications interface, a second communications interface, a first receive buffer, and a second receive buffer. The first communications interface is configured to send and receive the data over the industrial process network via a first communications protocol at a first data rate. The second communications interface is configured to communicate with a processor via a second communications protocol at a second data rate that is greater than the first data rate. The first receive buffer is configured to store a first message object corresponding to a first message received over the industrial process network. The second receive buffer is configured to store a second message object corresponding to a second message received over the industrial process network.

In another example, a method of sending and receiving data over an industrial process network includes receiving, by a communications unit of a field device, a first message via a first communications protocol at a first data rate. The method further includes storing, by the communications unit, the first message in a first receive buffer of the communications unit, and determining, by the communications unit, that the first message comprises a complete message according to the first communications protocol. The method further includes notifying, by the communications unit in response to determining that the first message comprises a complete message, a processor of the of the field device that the first message has been received, and sending, by the communications unit, the first message to the processor via a second communications protocol at a second data rate that is greater than the first data rate.

DETAILED DESCRIPTION

According to techniques of this disclosure, a communications unit, such as a communications unit of a field device or other instrument, is communicatively coupled to an industrial process network. The communications unit includes a first communications interface and a second communications interface. The first interface is configured to communicate over the industrial process network via a first communication protocol (e.g., the HART protocol) at a first data rate, such as 1,200 bits per second. The second interface is configured to communicate with a processor via a second communications protocol, such as the Serial Peripheral Interface (SPI) protocol, at a second data rate that is greater than the first data rate. The higher speed interface between the communications unit and the processor can enable the processor to retrieve larger amounts of data per given unit of time, thereby allowing fewer interrupts of the processor to retrieve a message received over the industrial process network. In addition, the communications unit can determine an error status of received messages, and can interrupt the processor to retrieve only those messages that are determined to have non-fatal errors, thereby further reducing a number of interrupts of the processor. Messages received over the industrial process network can be stored in one or more message buffers of the communications unit. Accordingly, rather than interrupt the processor multiple times per message, the communications unit can interrupt the processor to retrieve a message after a complete message is received. In this way, a communications unit implementing techniques of this disclosure can decrease task-switching loads on the processor, thereby enabling the processor to devote more time and/or processing power to non-communicative tasks such as data manipulation and processing. Moreover, multiple message buffers can enable the communications unit to store multiple received messages, such as when a subsequent message is received before a prior message is retrieved by the processor. In a similar manner, the communications unit can, in certain examples, store a complete message to be transmitted over the industrial process network in a transmit buffer, thereby enabling the communications unit to offload transmission tasks from the processor and transmit a complete message without requiring multiple interrupts of the processor to transmit the message. As such, techniques of this disclosure can decrease loads on a processor of a field device and increase robustness of communications over the industrial process network.

Figure 1:
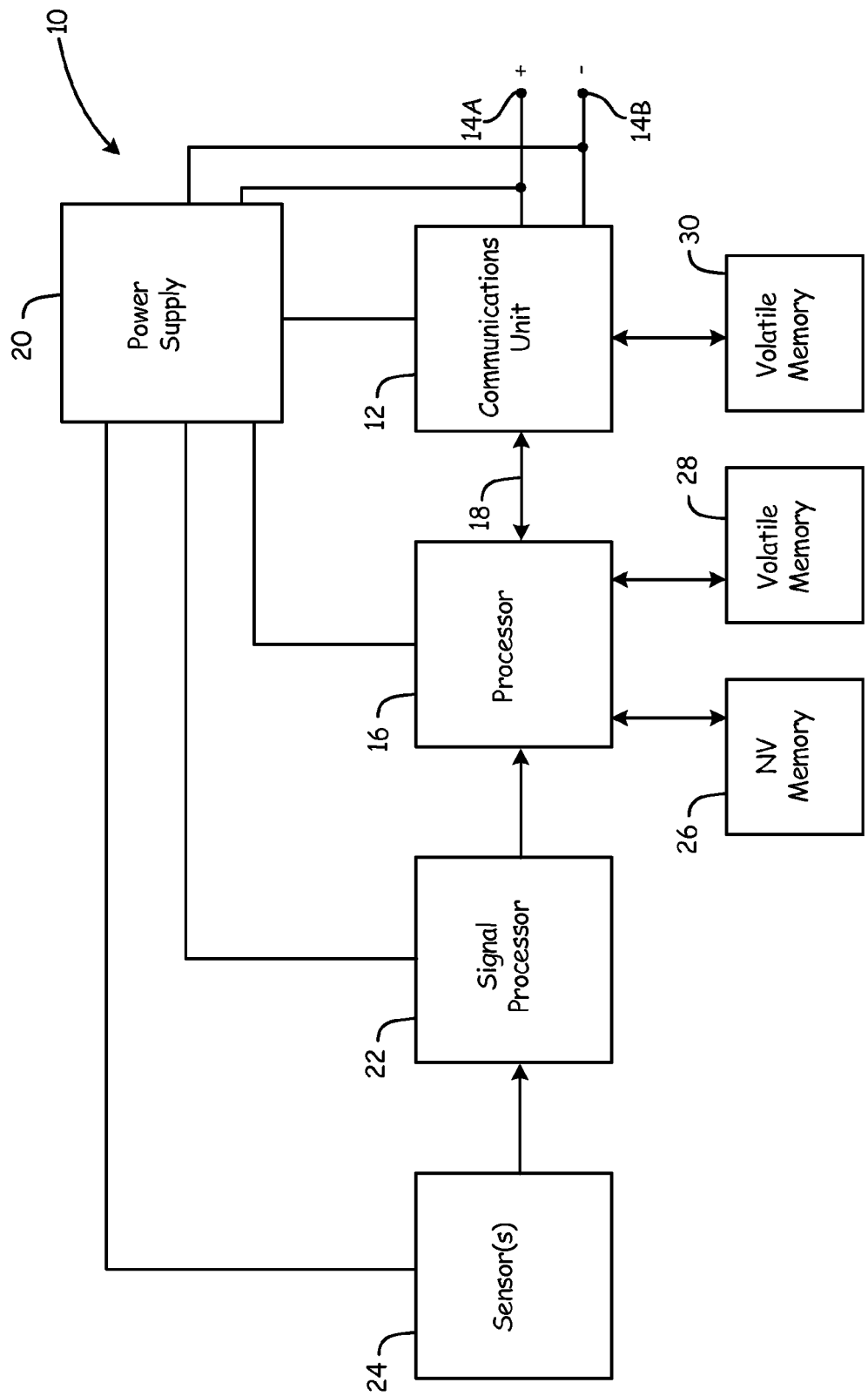
FIG. 1 is a block diagram of a field device including a communications unit that is communicatively connected to an industrial process network via a first interface and connected to communicate with a processor via a second interface.

FIG. 1 is a block diagram of field device 10 including communications unit 12 that is communicatively connected to an industrial process network via positive terminal 14A and negative terminal 14B (collectively referred to herein as "terminals 14") and connected to communicate with processor 16 via interface 18. While field device 10 is described herein within the context of a HART system, it should be understood that techniques of this disclosure have general applicability to industrial process networks having field devices that send and receive data over the network.

As illustrated in FIG. 1, field device 10 can be communicatively connected to an industrial process network, such as a HART network, via terminals 14. Terminals 14 provide an interface between field device 10 and the network to enable communications between field device 10 and a controller or other instruments connected to the network. Field device 10 can be a process instrument that senses one or more process parameters and provides data based upon the sensed parameters. In some examples, field device 10 can be a process actuator, which provides a physical output based upon a command message received over an industrial process network via terminals 14. In certain examples, field device 10 can include both sensing and actuating capabilities.

As illustrated in FIG. 1, field device 10 can also include power supply 20, signal processing circuitry 22, sensors 24, non-volatile memory 26, volatile memory 28, and volatile memory 30. Power supply 20 supplies power to components of field device 10. For instance, as in the illustrated example of FIG. 1, power supply 20 can draw power from the HART loop (e.g., up to 40 milliwatts) and supply power to components such as communications unit 12, processor 16, signal processing circuitry 22, and sensors 24 for operation of the components.

Sensors 24 sense one or more process parameters or variables and provide sensor signals to signal processing circuitry 22. The sensor signals can include one or more of a primary variable (e.g., pressure) and a secondary variable (e.g., temperature). The secondary variable can be used, for example, by processor 16 for correction or compensation of the sensor signal representing the primary variable.

Signal processing circuitry 22 typically includes analog-to-digital conversion circuitry, as well as filtering and other signal processing to format the sensor signals for use by processor 16. For example, signal processing circuitry 22 can include one or more sigma delta analog-to-digital converters and digital filters to provide digitized and filtered sensor signals to processor 16.

Processor 16 can be configured to implement functionality and/or process instructions for execution within field device 10. For instance, processor 16 can be capable of processing instructions stored in one or more of non-volatile memory 26 and volatile memory 28, such as instructions to create and select data to be contained in messages that will be transmitted from field device 10 over the industrial process network via communications unit 12 and terminals 14, as is further described below. Examples of processor 16 can include any one or more of a microprocessor, a controller, a digital signal processor (DSP), an application specific integrated circuit (ASIC), a field-programmable gate array (FPGA), or other equivalent discrete or integrated logic circuitry.

Non-volatile memory 26 can be used to store program instructions for execution by processor 16. In some examples, non-volatile memory 26 can store configuration data, calibration data, and other information used by processor 16 to control operation of field device 10. Non-volatile memory 26 can, in certain examples, be configured to store larger amounts of information than volatile memory, and can be configured for long-term storage of information. Examples of such non-volatile storage elements can include flash memories, or forms of electrically programmable memories (EPROM) or electrically erasable and programmable (EEPROM) memories.

Volatile memory 28 can also be configured to store information within field device 10 during operation. Volatile memory 28 can store data that can, over time, change (e.g., in RAM or cache). Volatile memory 28 can be considered a temporary memory, meaning that a primary purpose of volatile memory 28 is not long-term storage. Examples of volatile memories can include random access memories (RAM), dynamic random access memories (DRAM), static random access memories (SRAM), and other forms of volatile memories. In some examples, volatile memory 28 is used by software or applications executing on field device 10 to temporarily store information during program execution.

Volatile memory 30, illustrated as connected to communications unit 12, can be substantially similar to volatile memory 28. That is, volatile memory 30 can include RAM, DRAM, SRAM, or other forms of volatile memories that can be used by communications unit 12 to temporarily store data during operation of field device 10. For instance, communications unit 12 can use volatile memory 30 to store message objects corresponding to messages received and/or to be transmitted over the industrial process network, as is further described below. While illustrated as including two volatile memories 28 and 30, in certain examples field device 10 can include a single volatile memory shared by processor 16 and communications unit 12. In such examples, field device 10 may include a controller that coordinates access to the shared memory. While illustrated separately from processor 16 and communications unit 12, memories 26, 28, and 30 can, in some examples, be integrated with one or more of processor 16 and communications unit 12. For instance, volatile memory 30 can be integrated with communications unit 12. Similarly, one or more of non-volatile memory 26 and volatile memory 28 can be integral to processor 16. In some examples, communications unit 12 can also include and/or be coupled to non-volatile memory, such as to store configuration and/or other data for operation of communications unit 12.

One or more of non-volatile memory 26, volatile memory 28, and volatile memory 30 can, in some examples, be described as a computer-readable storage medium. In certain examples, a computer-readable storage medium can include a non-transitory medium. The term "non-transitory" can indicate that the storage medium is not embodied in a carrier wave or propagated signal.

Communications unit 12 is communicatively connected to an industrial process network via terminals 14. Communications unit 12 is configured to send and receive data over the industrial process network via a communications protocol, such as the HART protocol. Communications unit 12 can be an integrated circuit, such as an ASIC, a collection of discrete components, an FPGA, or other equivalent discrete or integrated logic circuitry.

Using the HART protocol, communications unit 12 can send and receive messages (e.g., to and/or from a host device and/or control station), which consist of asynchronous serial data transmitted at 1200 bits per second. According to the HART protocol, a logical 1 is represented by a 1,200 Hz signal, and a logical 0 is represented by a 2,200 Hz signal. That is, HART signals are phase continuous frequency-shift-keying (FSK) signals that are demodulated by first mixing with a free-running local oscillator frequency of 1,700 Hz, and then identifying the phase of the resultant signal. Mixing the HART signals with the 1,700 Hz frequency shifts the 1,200 Hz (binary 1) and 2,200 Hz (binary 0) signals to +/−500 Hz signals. The phase of the resultant signal will either continuously increase, thereby indicating that the resultant signal was derived from the 1,200 Hz signal, or the phase will continuously decrease, thus indicating that the resultant signal was derived from the 2,200 Hz signal. Bit recognition of the HART protocol is achieved by sensing whether the phase is increasing (binary 1) or decreasing (binary 0). In this way, communications unit 12 can modulate and demodulate digital signals via terminals 14 at a data rate of 1,200 bits per second according to the HART communications protocol.

According to techniques of this disclosure, communications unit 12 is further connected to communicate with processor 16 via interface 18 at a data rate that is greater than the data rate of messages received via terminals 14. For example, communications unit 12 can communicate with processor 16 via interface 18 using the Serial Peripheral Interface (SPI) protocol at data rates as high as 921.6 kilobits per second. In operation, communications unit 12 demodulates signals received via terminals 14 and transfers the message data to processor 16 via interface 18. For example, communications unit 12 can invoke an interrupt of processor 16 to cause processor 16 to service an interrupt service routine configured to retrieve the message via interface 18. The high speed communication between communications unit 12 and processor 16 can enable processor 16 to retrieve larger amounts of data per given unit of time. Accordingly, high speed interface 18 can enable fewer interrupts of processor 16 to retrieve a message than would be required were processor 16 connected to communications unit 12 via a slower speed interface.

In some examples, communications unit 12 can store received message data in a message buffer (e.g., in volatile memory 30), and can invoke an interrupt of processor 16 upon receipt of an entire message. In this way, rather than interrupt processor 16 multiple times per message, such as after every eight bits of received data, communications unit 12 can interrupt processor 16 once per message (e.g., after up to thirty bytes of data). As such, communications unit 12 can help decrease task-switching loads on processor 16 associated with servicing the interrupts, thereby enabling processor 16 to devote more time and/or processing power to other tasks, such as data manipulation and/or processing. Moreover, in certain examples, communications unit 12 can store multiple message buffers, each corresponding to a different received message. For instance, in the event that a first received message is not retrieved by processor 16 prior to receiving a second message, communications unit 12 can store the second message in a second buffer to avoid data loss or buffer overruns, thereby increasing robustness of communications. In certain examples, communications unit 12 can store an entire message to be transmitted over the industrial process network via terminals 14, thereby enabling communications unit 12 to transmit data using a single interrupt of processor 16. Accordingly, communications unit 12, utilizing high speed interface 18 and/or volatile memory 30, can reduce operational loads on processor 16 and can increase robustness of communications via the industrial process network.

Figure 2:
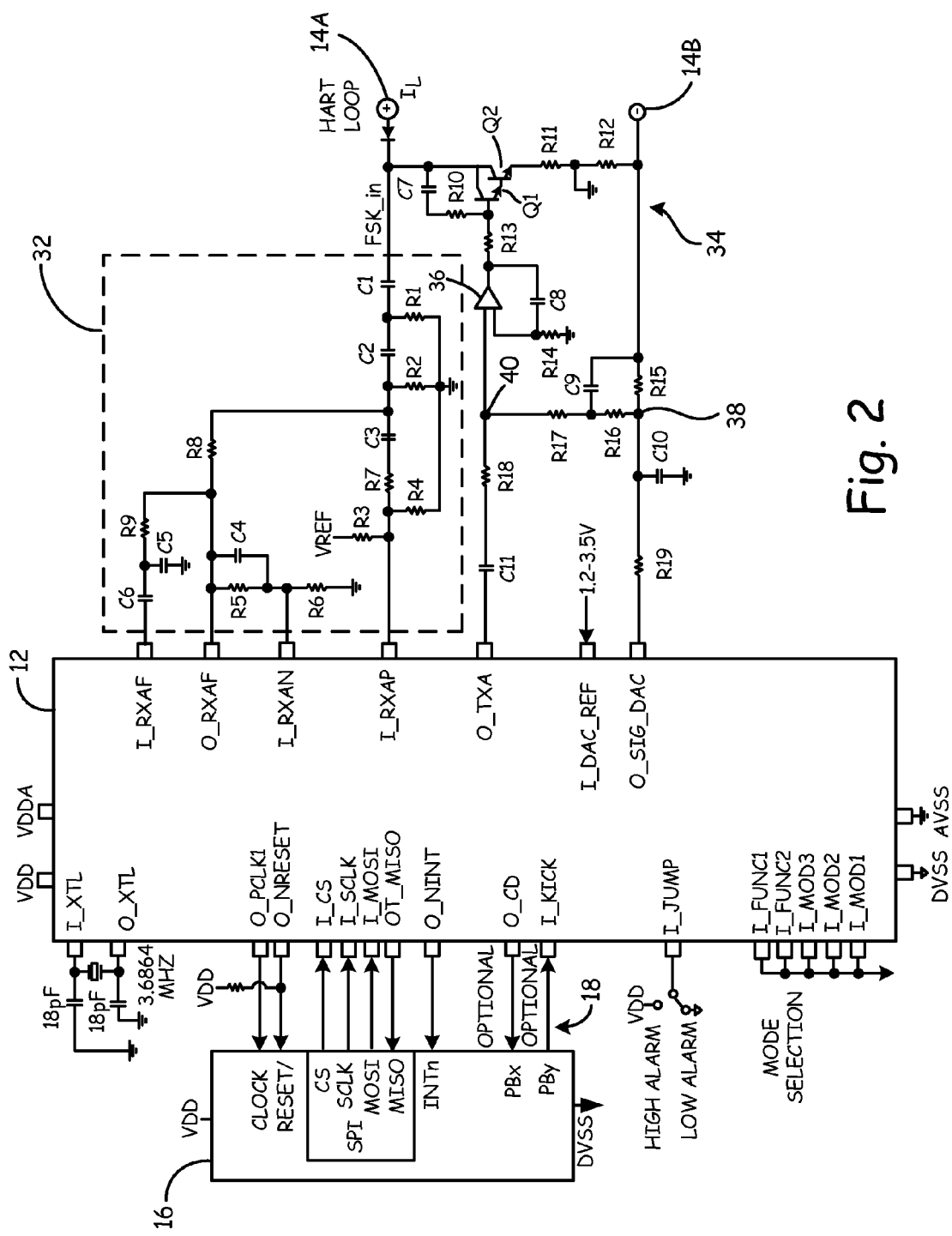
FIG. 2 is a schematic diagram of a communications unit that is connected to communicate with a processor via the Serial Peripheral Interface (SPI) protocol and to send and receive data over an industrial process network via the Highway Addressable Remote Transducer protocol.

FIG. 2 is a schematic diagram of one embodiment of communications unit 12 that is connected to processor 16 via interface 18 and to a HART network via terminals 14. As illustrated in FIG. 2, communications unit 12 connects to terminals 14 (and hence to the HART network) via input terminals I_RXAF, I_RXAN, and I_RXAP, and via output terminals O_RXAF, O_TXA, and O_SIG_DAC. In this way, terminals I_RXAF, I_RXAN, I_RXAP, O_RXAF, O_TXA, and O_SIG_DAC define an interface by which communications unit 12 couples to terminals 14 that connect to the current loop of the HART network.

Communications unit 12 connects to interface filter circuitry 32, illustrated by dashed lines, via terminals I_RXAF, O_RXAF, I_RXAN, and I_RXAP. Interface filter circuitry 32 includes resistors R1-R9 and capacitors C1-C6, which are configured to filter incoming signals received via the HART network. In operation, FSK HART signals received as input via the current loop through terminals 14 flow through interface filter circuitry 32 which filters and conditions the received signal.

As further illustrated, communications unit 12 connects to current control circuitry 34 via output terminals O_TXA and O_SIG_DAC. Current control circuitry 34 includes resistors R10-R19, capacitors C7-C11, transistors Q1 and Q2, and operational amplifier 36. Current control circuitry 34 is configured to control a direct current (DC) $I_L$ that flows from terminal 14A to terminal 14B to indicate a value of a process variable sensed by sensors 24 (FIG. 1), such as by adjusting the value of current $I_L$ between four and twenty milliamps. In addition, current control circuitry 34 superimposes an alternating current (AC) FSK signal on the DC signal to transmit messages over the HART network according to the HART protocol.

For example, as illustrated with respect to FIG. 3 below, communications unit 12 can include a digital-to-analog converter (DAC) that converts digital information (e.g., digital information stored in one or more message buffers, sensor signals converted to digital format for processing by processor 16, or other digital information) to an analog voltage. In operation, communications unit 12 outputs a pulse width modulated signal having an average voltage on terminal O_SIG_DAC that is based upon a process variable sensed by one or more sensors 24 (FIG. 1), converted to a digital value and processed by signal processing circuitry 22 (FIG. 1), processed by processor 16, and received by communications unit 12 via interface 18.

As illustrated in FIG. 2, the voltage output via terminal O_SIG_DAC is applied through resistors R19, R16, and R17 to the positive (i.e., non-inverting) input of operational amplifier 36. The voltage that is applied at the positive input of operational amplifier 36 is based not only on the voltage output via terminal O_SIG_DAC, but is also combined with a feedback voltage that is developed across the feedback resistor R12 that is connected between ground and the negative terminal 14B. Accordingly, as current $I_L$ increases, the voltage across feedback resistor R12 increases. The negative voltage is applied through resistor R15 and joins with the signal from O_SIG_DAC at node 38, thereby combining the positive voltage from O_SIG_DAC with the negative feedback voltage which is applied through resistors R16 and R17 to the positive input of operational amplifier 36.

The output of operational amplifier 36 is tied through capacitor C8 to the inverting (i.e., negative) input of operational amplifier 36. Resistor R14 provides filtering that slows, based on an RC time constant of capacitor C8 and resistor R14, a rate of change of the voltage at the negative input of operational amplifier 36, so as to help prevent dithering of the signal. The output of operational amplifier 36 is also applied through resistor R13 into the base of transistor Q1 that, along with transistor Q2, forms a Darlington transistor pair. That base current controls the collector and emitter current in resistor Q1. The current from the emitter of transistor Q1 flows to the base of transistor Q2, the second transistor of the Darlington pair. The base current of the second transistor controls the amount of current flow from collector to emitter of the second, larger transistor Q2, thereby controlling an amount of current from positive terminal 14A to negative terminal 14B. In this way, current control circuitry 34 is configured, based on an output from communications unit 12 via terminal O_SIG_DAC, to set a base DC current flowing through the HART current loop.

In addition, current control circuitry 34 is configured to superimpose an AC FSK signal on the DC signal to transmit messages over the HART network according to the HART protocol. For instance, as described above, communications unit 12 can send and receive messages consisting of asynchronous serial data transmitted at 1,200 bits per second, where a logical 1 is represented by a 1,200 Hz signal and a logical 0 is represented by a 2,200 Hz signal. In operation, communications unit 12 outputs an AC waveform at output terminal O_TXA, the AC waveform including one of a 1,200 Hz signal (i.e., a logical 1) or a 2,200 Hz signal (i.e., a logical 0). The AC signal passes through capacitor C11 and through resistor R18 to node 40 where the current command signal $I_L$ is applied to the non-inverting positive input of operational amplifier 36. In this way, the transmit signal from O_TXA is superimposed on the DC current level that is established in the current loop through terminals 14. As the transmit signal varies between positive and negative amplitude, it changes the DC current in the current loop at an instantaneous level while ensuring that the average current level in the loop balances to the DC command current $I_L$. Accordingly, communications unit 12 ensures that the HART signal does not disrupt the loop current measurement indicating the value of the process variable output from the field device.

As further illustrated in the embodiment shown in FIG. 2, communications unit 12 is connected to processor 16 via input terminals I_CS, I_SCLK, I_MOSI, I_KICK, and output terminals O_PCLK1, O_NRESET, OT_MISO, O_NINT, and O_CD. Output terminal O_PCLK1, upon which a programmable clock signal can be output by communications unit 12, is connected to a CLOCK input terminal of processor 16. For example, as illustrated, communications unit 12 further includes terminals I_XTL and O_XTL. Input terminal I_XTL, in some examples, can receive a clock signal from an oscillator, such as the 3.6864 MHz oscillator illustrated in FIG. 2. In other examples, communications unit 12 can receive an external clock signal via terminal O_XTL. In such examples, input terminal I_XTL can be tied low. The received clock signal (e.g., received via terminal I_XTL or O_XTL) can be used to set a clock rate of communications unit 12, such as a clock rate equal to the received clock rate, or a clock rate equal to divisions of the received clock rate, such as one-eighth of the received clock rate, one quarter of the received clock rate, or other divisions of the received clock rate. The calculated clock rate can be output to processor 16 via output terminal O_PCKL1. Output terminal O_NRESET, connected to a RESET input terminal or processor 16, can be used to reset processor 16, such as when processor 16 fails to transmit data to watchdog circuitry of communications unit 12. For instance, as illustrated, input terminal I_KICK of communications unit 12 can be connected to output terminal PBy of processor 16. Processor 16 can output data (e.g., one or more bits) over output terminal PBy, which is received by communications unit 12 via input terminal I_KICK. In response to determining that data has not been received via terminal I_KICK for a threshold amount of time, watchdog circuitry of communications unit 12 (illustrated in FIG. 3) can be configured to output a reset command to processor 16 via terminal O_NRESET, the reset command configured to reset operations of processor 16.

Each of mode selection pins I_FUNC1, I_FUNC2, I_MOD3, I_MOD2, and I_MOD1 can be optionally tied to ground, the combination of which indicates a mode of operation of communications unit 12. For example, communications unit 12 can be configured to operate in one of a plurality of modes, such as one of a full-function mode, a semi-retrofit mode, a basic modem mode, and a digital-only mode. Communications unit 12 can configure one or more functional and/or physical attributes of communications unit 12 based on the indicated mode. For instance, in response to determining that the combination of mode selection pins I_FUNC1, I_FUNC2, I_MOD3, I_MOD2, and I_MOD1 indicates a full-function mode, communications unit 12 can enable each physical component and/or functional attribute of communications unit 12. As another example, in response to determining that a semi-retrofit mode is indicated, communications unit 12 can disable message buffering functions and/or physical components associated with such functions (e.g., one or more volatile memories). In response to determining that a digital-only mode is indicated, communications unit 12 can disable (e.g., refrain from providing electrical power to) analog circuitry, such as digital-to-analog converters and the like. In response to determining that a basic modem mode is indicated, communications unit 12 can implement only modem functionality, such as by disabling digital-to-analog outputs and utilizing a wake-up pin to indicate when operation of communications unit 12 is requested. The different operational modes can enable communications unit 12 to be compatible with various implementations of the HART protocol, as well as to decrease power consumption by disabling physical components that are not needed during operation within the indicated functional mode.

As illustrated in FIG. 2, chip select input terminal I_CS of communications unit 12 is connected to a chip select output terminal CS of processor 16. Serial data clock input terminal I_SCLK of communications unit 12 is connected to serial data clock output terminal SCKL of processor 16. In addition, master-out-slave-in input terminal I_MOSI of communications unit 12 is connected to master-out-slave-in output terminal MOSI of processor 16. Master-in-slave-out output terminal OT_MISO of communications unit 12 is connected to master-in-slave-out input terminal of processor 16. Terminals I_CS, I_SCLK, I_MOSI, and OT_MOSI of communications unit 12 connected to terminals CS, SCKL, MOSI, and MISO of processor 16 can define an interface between communications unit 12 and processor 16 configured to communicate via a serial peripheral interface (SPI) protocol. Such interfaces are often referred to as a SPI bus. However, while the present example is described with respect to an SPI protocol, other protocols and interfaces between communications unit 12 and processor 16 are possible. For instance, another example interface utilized between communications unit 12 and processor 16 can be a Serial Communications Interface (SCI). In general communications unit 12 and processor 16 can communicate via any communications protocol that enables a data transfer rate that is greater than a data transfer rate of the industrial process network.

A SPI bus typically operates with a master device and one or more slave devices. In the example of FIG. 2, processor 16 can be configured as a master device, and communications unit 12 can be configured as a slave device. Accordingly, data transmitted by processor 16 via the output terminal MOSI is received by communications unit 12 via input terminal I_MOSI. Similarly, data transmitted by communications unit 12 via output terminal OT_MISO is received by processor 16 via input terminal MISO. Communications between processor 16 and communications unit 12 via the SPI bus can be accomplished at data rates that are less than or equal to a maximum clock rate of the devices. For example, communications unit 12 can transmit data, such as messages received over the HART network via terminals 14 (i.e., messages received at a rate of 1,200 bits per second), to processor 16 via the SPI bus. Similarly, communications unit 12 can receive messages to be transmitted over the HART network from processor 16 via the SPI bus. The data transfers over the SPI bus can be accomplished at data rates that are greater than a data rate of messages received over the HART network (e.g., data rates greater than 1,200 bits per second), such as data rates as high as 921.6 kilobits per second.

In operation pursuant to this embodiment, communications unit 12 receives HART messages via terminals 14 at input terminals I_RXAF, I_RXAN, and I_RXAP. Communications unit 12 demodulates the received signals, which have been filtered by interface filter circuitry 32, to determine the serial data received at a data rate of 1,200 bits per second. Communications unit 12 can store the received data and/or information corresponding to the received data in one or more message buffers, as is further described below.

In response to receiving a threshold amount of data (e.g., a threshold number of bits, a threshold number of bytes, a complete message, or other threshold amounts of data), communications unit 12 can output an indication to processor 16 configured to cause processor 16 to retrieve the received data. For instance, as illustrated in FIG. 2, communications unit 12 can include interrupt terminal O_NINT connected to an interrupt terminal INTn of processor 16. Communications unit 12 can output a notification to processor 16 to cause processor 16 to invoke an interrupt service routine of processor 16, such as by adjusting a voltage on interrupt terminal O_NINT between a voltage indicating a logical 0 (e.g., a low-state voltage, such as a voltage at or about zero volts) and a voltage indicating a logical 1 (e.g., a high-state voltage, such as a voltage at or about 3.3 volts). For instance, as in the example of FIG. 2, terminal O_NINT can be active low, meaning that no interrupt is requested when terminal O_NINT is held high (indicating a logical 1), and an interrupt is requested when terminal O_NINT is held low (indicating a logical 0). In other examples, terminal O_NINT can be active high, meaning that a high-state voltage indicates a requested interrupt, and a low-state voltage indicates that no interrupt is requested.

In operation, communications unit 12 asserts O_NINT to invoke an interrupt service routine of processor 16 to service the interrupt. In addition, communications unit 12 can indicate a type of interrupt and/or information corresponding to the received message via registers of communications unit 12. Such information corresponding to the received message can include message status information, error information, a number of bytes of data in the received message, or other information corresponding to the received message. In response to receiving the indication of the interrupt via interrupt terminal INTn, processor 16 initiates a data transaction to retrieve the received message via the SPI bus. For example, according to the SPI protocol, processor 16 can assert a chip select signal via terminal CS, which is received by communications unit 12 via input terminal I_CS to initiate SPI communications. Further, processor 16 can transmit data to configure a data rate of data transfers via output terminal SCKL, which is received by communications unit 12 via input terminal I_SCLK. Thereafter, data transfers are accomplished between processor 16 and communications unit 12 at the data rate established via terminals SCLK and I_SCLK.

Processor 16 transmits data via the MOSI terminal of processor 16 to acknowledge the bits set in the interrupt register of communications unit 12. In response to receiving the acknowledgment, communications unit 12 de-asserts the O_NINT terminal. Processor 16 can determine if any errors are associated with the received message, such as by reading one or more bits of a received message status register of communications unit 12. That is, communications unit 12 can determine whether an error is associated with a received message, such as by determining if a check-byte of a received message validates the message. Communications unit 12 can, in certain examples, set one or more bits of a register, such as a received message status register, to notify processor 16 of the type and/or existence of the error. In addition, communications unit 12 can set one or more bits of a register, such as a received byte count register, to indicate a number of bytes of data included in the received message and/or a message object that includes the message and information corresponding to the message (e.g., message type information, message status information, message header information, message preamble information, or other types of information). Processor 16 can read the received byte count register (i.e., via terminals MOSI and MISO) to determine a number of bytes of data included in the received message and/or message object. In some examples, communications unit 12 can determine whether to notify processor 16 of the received message (e.g., by asserting interrupt terminal O_NINT) based on an error status of the received message. For instance, as is further described below, communications unit 12 can implement a state machine that determines an error status of received messages, such as a framing error, a parity error, a gap error, a loss of carrier detect error, a check byte error, or other such errors. Communications unit 12, in certain examples, can determine whether the error status is fatal or non-fatal. In such examples, communications unit 12 can output the received message notification to processor 16 in response to determining that the error status is a non-fatal error status, and can refrain from outputting the received message notification in response to determining that the error status is a fatal error status.

Processor 16 initiates, in response to receiving the received message notification (e.g., an interrupt via terminal INTn of processor 16), a transaction via the SPI bus to retrieve the received message data from communications unit 12. For example, processor 16 can transmit data via the MOSI terminal which is received by communications unit 12 via the I_MOSI terminal, the data indicating an amount of data (e.g., a number of bytes) to be transmitted from communications unit 12 to processor 16. The requested amount of data can include all or a portion of the amount of data indicated in the received byte count register. In this way, processor 16 can retrieve an entire message and/or message object in a single transaction, or can retrieve the message and/or message object via multiple transactions. In some examples, the data rate of transactions via the SPI bus can enable processor 16 to retrieve an entire message and/or message object within a timeframe allotted by processor 16 to service the interrupt, thereby enabling processor 16 to retrieve the entire amount of data in response to one interrupt of processor 16. Accordingly, techniques of this disclosure can help decrease task-switching loads on processor 16 that can result from servicing multiple interrupts.

Communications unit 12, in response to receiving the data from processor 16 initiating the transaction, transmits the indicated number of bytes of the message data to processor 16 via terminal OT_MISO. The transmitted data is received by processor 16 via terminal MISO of processor 16. In addition, the data transmitted by communications unit 12 can include one or more bytes and/or bits indicating that an entire message (e.g., an entire HART frame) has been transferred. Such bytes and/or bits can be considered an end-of-message (EOM) indication. Processor 16, in response to receiving the EOM indication, transmits a message-received notification, such as by setting one or more bits in a received message acknowledgment register of communications unit 12 to complete the message transaction to retrieve message data received via the HART network.

Processor 16 can transmit data (e.g., message data, process variable data, or other types of data) over the HART network by transmitting the data to communications unit 12 over the SPI bus. For instance, processor 16 can shift message data out over output terminal MOSI, which is received by communications unit 12 via input terminal I_MOSI. Processor 16 can output a transmit enable command via output terminal MOSI (and received via input terminal I_MOSI). In response to receiving the transmit enable command, communications unit 12 can transmit the message data via terminals 14 by converting the digital message data to an analog current that is modulated and output via output terminal O_TXA and current control circuitry 34, as was described above. In response to transmitting the entirety of the message data, communications unit 12 can output an acknowledgement to processor 16 that the message transmission is complete, such as by asserting terminal O_NINT and writing to one or more bits of an interrupt status register that is read by processor 16, the one or more bits configured to indicate that the transmission is complete. In response, processor 16 can transmit a return acknowledgement to communications unit 12, such as by writing to one or more bits of an interrupt acknowledgment register that is read by communications unit 12. In some examples, communications unit 12 can de-assert terminal O_NINT in response to receiving the acknowledgement from processor 16.

In some examples, communications unit 12 can store an entire message and/or message object to be transmitted over the HART network in a message buffer of communications unit 12, as is further described below. In this way, communications unit 12 can enable processor 16 to transmit an entire message to be transmitted over the HART network within a time allotted to service a single interrupt, thereby helping to decrease task-switching loads on processor 16.

As described herein, communications unit 12 can send and receive message data over an industrial process network via a first protocol (e.g., the HART protocol) at a first data rate (e.g., 1,200 bits per second). Communications unit 12 can store the message data (i.e., received message data and/or message data to be transmitted over the industrial process network) in one or more message buffers. In response to receiving a threshold amount of data over the industrial process network (e.g., a threshold number of bytes, a complete HART frame, or other amounts of data), communications unit 12 can output a notification to processor 16 to retrieve the message data. In certain examples, communications unit 12 can output the notification to processor 16 to retrieve the message data based on an error status of the received message, such as a fatal or non-fatal error status. Processor 16 can retrieve the message data and send data to be transmitted over the industrial process network via a second communications protocol (e.g., the SPI protocol) at a second data rate (e.g., up to 921.6 kilobits per second) that is greater than the first data rate of the first protocol. Accordingly, processor 16 can transmit to and/or retrieve from communications unit 12 a greater amount of data per unit of time, thereby enabling processor 16 to retrieve received messages and transmit messages in response to fewer interrupts (e.g., a single interrupt). In this way, techniques of this disclosure can decrease task-switching loads on processor 16, thereby enabling processor 16 to devote more time and/or processing power to non-communicative tasks, such as signal processing and/or data manipulation.

Figure 3:
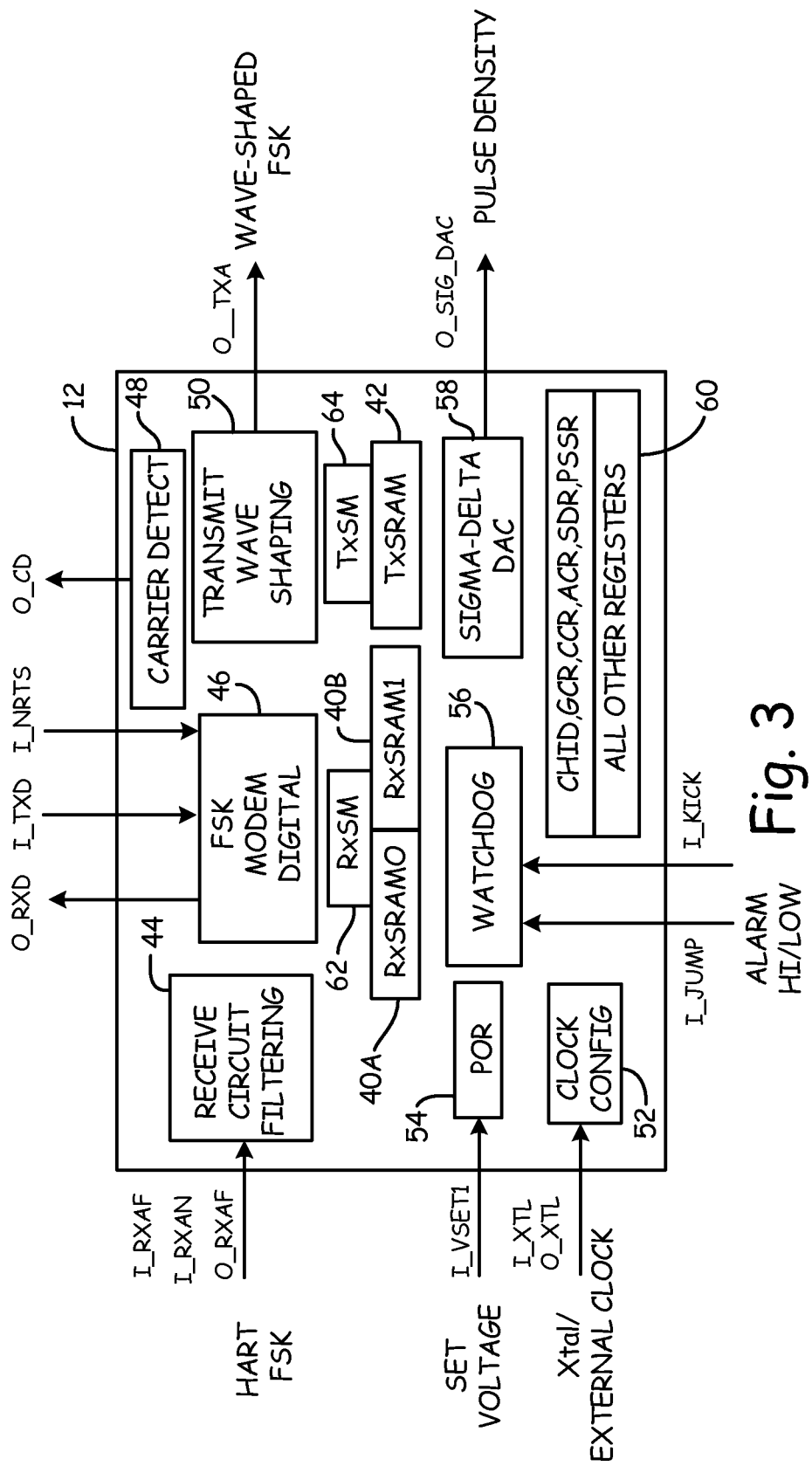
FIG. 3 is a block diagram of a communications unit that includes message buffers for communications between a processor and an industrial process network.

FIG. 3 is a block diagram of one embodiment of communications unit 12 that includes receive message buffers 40A and 40B and transmit message buffer 42 for communications between a processor (e.g., processor 16 of FIGS. 1-2) and an industrial process network (e.g., a HART network). As illustrated in FIG. 3, communications unit 12 can further include receive filter circuitry 44, FSK digital modem 46, carrier detect circuitry 48, transmit wave shaping circuitry 50, clock configuration circuitry 52, power on reset (POR) circuitry 54, watchdog circuitry 56, sigma-delta DAC 58, and registers 60.

POR circuitry 54 receives a set voltage input via terminal I_VSET1. POR can include a comparator or other equivalent circuitry to compare analog voltage received by communications unit 12 (e.g., from power supply 20 of FIG. 1) to the voltage received via terminal VSET1. In response to determining that the received analog voltage is less than the voltage received via terminal VSET1, POR circuitry 54 resets communications unit 12 to a default state, such as by cycling power to components of communications unit 12. Accordingly, POR circuitry 54 resets communications unit 12 on power-up and when analog power to communications unit 12 drops below a set voltage (e.g., for initialization and brown-out protection).

Clock configuration circuitry 52 receives clock cycle signals via terminals I_XTL and O_XTL. For instance, as described above with respect to FIG. 2, clock configuration circuitry 52 can receive a clock signal from an oscillator via terminal I_XTL. In other examples, clock configuration circuitry 52 can receive a clock signal from an external clock via terminal O_XTL, in which case terminal I_XTL can be tied low. The received clock signal can be used to set a clock rate of communications unit 12.

Watchdog circuitry 56 receives alarm state configuration information via terminal I_JUMP and data indicating processor activity via terminal I_KICK. For example, watchdog circuitry 56 can be configured to output a reset command in response to a lack of data (e.g., a bit toggle) received via terminal I_KICK from the processor for a threshold amount of time (e.g., half a second, one second, two seconds, or other threshold amounts of time). In addition, watchdog circuitry 56 can be configured to output an alarm in the event that processor inactivity is detected (e.g., via terminal I_KICK), a clock failure is detected, received clock signals are inconsistent or otherwise unreliable, or other such events. An alarm issued by watchdog circuitry 56 can be based at least in part on a state of a signal received via terminal I_JUMP. For example, when a voltage on terminal I_JUMP is greater than a threshold voltage (i.e., held high), watchdog circuitry 56 can annunciate an alarm by causing sigma-delta DAC 58 to output a signal at a maximum duty cycle, such as a fifty percent duty cycle at 230.4 KHz. As another example, when a voltage on terminal I_JUMP is less than a threshold voltage (i.e., held low), watchdog circuitry 56 can annunciate an alarm by causing sigma-delta DAC 58 to output a signal at a constant high or low signal. The output from sigma-delta DAC 58 can be connected, via the HART loop, to a control room, thereby annunciating the alarm to a controller and/or control personnel.

Receive filter circuitry 44 receives the HART FSK signal via terminals I_RXAF, I_RXAN, and O_RXAF. Carrier detect circuitry 48 detects the presence of a HART FSK signal on the received signal, and outputs an indication that the carrier signal is detected via terminal O_CD (e.g., to the processor), such as by adjusting a voltage on terminal O_SD to a state representing a logical 1 (e.g., active high).

HART FSK signals received and processed by receive filter circuitry 44 are routed to FSK digital modem 46, which, in certain examples, demodulates the FSK signal (including 1,200 Hz and 2,200 Hz frequencies) and reproduces a digital non-return-to-zero (NRZ) signal. In other examples, such as when communications unit 12 is configured to operate in a semi-retrofit function mode, FSK digital modem 46 receives digital data (e.g., from the processor) in NRZ form via terminal I_TXD. The NRZ signal is routed to receive state machine circuitry 62, which implements state machine logic that determines information corresponding to a received message (e.g., status information, error information, or other information) and stores the information in one of message buffer 40A and message buffer 40B. Message buffers 40A and 40B can be stored in volatile memory of communications unit 12, such as volatile memory 30 (FIG. 1). Message buffers 40A and 40B can be configured to store message objects, the message objects including received message data as well as information corresponding to the received message data, such as status information (e.g., error status information) determined by receive state machine 62, message header information, message preamble information, or other information corresponding to a received message. That is, communications unit 12 stores received message data in one of message buffer 40A and 40B, and receive state machine 62 determines and stores information corresponding to the received message in the corresponding one of message buffer 40A and 40B, the combination of received message data and information corresponding to the message data defining a message object.

In operation pursuant to this embodiment, communications unit 12 stores received message data in receive buffer 40A and determines an amount of received data (e.g., a number of bytes), which is updated in a received byte count register of registers 60. In addition, information corresponding to the received message, such as message header information, status information determined by receive state machine 62, and other such information is also stored in receive buffer 40A. In some examples, in response to receiving a threshold number of bytes of data and/or a complete message (e.g., a complete HART frame), communications unit 12 outputs a notification to the processor (e.g., processor 16 of FIGS. 1 and 2) to cause the processor to retrieve the received message data. For instance, as was described above with respect to FIG. 2, communications unit 12 can invoke an interrupt of the processor to cause the processor to service an interrupt service routine that initiates a data transaction to retrieve the message data via the second interface (e.g., the SPI interface). In the event that subsequent message data is received by communications unit 12 before the received message object stored in message buffer 40A is retrieved by the processor, communications unit 12 can store the subsequent message data in message buffer 40B, thereby increasing robustness of communications by helping to prevent lost data and/or buffer overrun errors. While illustrated with respect to two message buffers 40A and 40B, communications unit 12 can, in some examples, include more than two message buffers. For instance, communications unit 12 can include three, four, five, or more message buffers to further increase robustness of communications.

Data stored in message buffer 40B can, in some examples, be transmitted to the processor subsequent to the transmission of data in message buffer 40A. In certain examples, communications unit 12 is configured to transmit data only from message buffer 40A, thereby transferring data from message buffer 40B to message buffer 40A prior to transmission or changing a definition of the message buffers to effectively swap identifiers of message buffers 40A and 40B. In this way, communications unit 12 can specify an active one of message buffers 40A and 40B. That is, an active message buffer can be the message buffer from which data is transferred.

In some examples, communications unit 12 can invoke the interrupt of the processor to cause the processor to retrieve the received message data based on an error status of the received message data. For example, receive state machine 62 can determine an error status of received messages (e.g., as the message data is received). Examples of such error statuses include, but are not limited to, framing errors, parity errors, gap errors, loss of carrier detect errors, and check byte errors.

A framing error can correspond to an undefined and/or incorrect location of a stop bit in a received message. A parity error can correspond to an undefined and/or incorrect value of a parity bit in a received message, such as a parity bit that indicates odd parity (i.e., an odd number of 1's in a byte) when an even parity (i.e., an even number of 1's in a byte) is specified, or a parity bit that indicates an even parity when an odd parity is specified. For example, an odd parity can correspond to a parity bit value of 1, and an even parity can correspond to a parity bit value of 0. One of an odd parity, an even parity, or no parity can be specified by the communications protocol. For instance, in examples where the HART communications protocol specifies an odd parity, a parity bit value of 0 for a received byte of data, corresponding to even parity, can correspond to a parity error. In examples where an even parity is specified, a parity bit value of 1 (corresponding to an odd parity) can correspond to a parity error.

A gap error can correspond to a failure to receive a start bit within a message, subsequent to receiving a stop bit, for a threshold amount of time, such as a threshold time of 12.5 milliseconds. A loss of carrier detect error can correspond to a low carrier detect signal prior to an expected stop bit of a check byte of the received message. A check byte error can correspond to a mismatch between a check byte value determined by receive state machine 62 with respect to a received message and a check byte value included in the received message. For instance, receive state machine 62 can determine a check byte value of a received message as the exclusive OR of all bytes of the received message. Communications unit 12 can compare the determined check byte value to a check byte value included in the received message, and can determine a check byte error when the determined check byte value does not match the received check byte value.

Communications unit 12 can determine a message error status as one of a fatal error status or a non-fatal error status. For instance, a framing error status corresponding to a framing error detected in any byte of a delimiter, address, or byte count portion of a received message can be considered a fatal framing error. Framing errors detected in other portions of a received message can be considered non-fatal framing errors. In certain examples, parity errors detected in a delimiter portion, address portion, or byte count portion of a received message can be considered fatal parity errors, and parity errors detected in data field regions of a received message can be considered non-fatal parity errors. In some examples, gap errors, loss of carrier detect errors, and check byte errors can each be considered fatal errors. In other examples, all errors can be considered fatal errors. In yet other examples, all errors can be considered non-fatal errors.

Communications unit 12 can determine whether to invoke an interrupt of the processor to retrieve a received message based on the determined error status of the message. For instance, communications unit 12 can invoke the interrupt of the processor in response to determining that an error status corresponding to a message is a non-fatal error status, and can refrain from invoking the interrupt in response to determining that the error status is a fatal error status. In this way, communications unit 12 can further decrease a number of interrupts and associated task-switching loads on the processor by refraining from interrupting the processor to retrieve corrupt and/or invalid messages.

As illustrated in the embodiment shown in FIG. 3, communications unit 12 further includes transmit buffer 42 and transmit state machine 64 which can determine status and other information corresponding to a message stored in transmit message buffer 42. Transmit buffer 42 can store a message object including message data to be transmitted over the HART network as well as information corresponding to the transmit message. For instance, communications unit 12 can store transmit buffer 42 in volatile memory 30 of FIG. 1. In some examples, transmit buffer 42 is configured to store a complete message (e.g., a complete HART frame).

In operation, sigma-delta DAC 58 converts process variable data to be transmitted over the HART network into an analog voltage. This analog voltage, output via terminal O_SIG_DAC, is used to control the DC current on the HART loop. In addition, transmit wave shaping circuitry 50 forms the modulated AC signal output via terminal O_TXA, which is superimposed on the DC current to indicate the HART signal, as was described above.

In this way, communications unit 12 can store message data in one or more message buffers, thereby increasing robustness of communications and decreasing task-switching loads on a processor of a field device. Accordingly, techniques of this disclosure can enable such a processor to devote more time and/or power to non-communicative tasks, such as data processing and/or manipulation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A field device configured to send and receive data over an industrial process network, the field device comprising:
   a processor; and
   a communications unit communicatively connected to the industrial process network, the communications unit configured to send and receive the data over the industrial process network via a first communications protocol at a first data rate and connected to communicate with the processor via a second communications protocol at a second data rate that is greater than the first data rate;

wherein the communications unit comprises:
a first receive buffer configured to store a first message object corresponding to a first message received by the communications unit over the industrial process network, the first message object including the first message and information corresponding to the first message; and
a second receive buffer configured to store a second message object corresponding to a second message received by the communications unit over the industrial process network, the second message object including the second message and information corresponding to the second message;

wherein the communications unit is configured to determine at least a portion of the information corresponding to the first message and at least a portion of the information corresponding to the second message; and wherein the communications unit is configured to insert the determined portion of the information corresponding to the first message in the first message object and the determined portion of the information corresponding to the second message in the second message object.

2. The field device of claim 1, wherein the communications unit implements a receive state machine configured to determine the portion of the information corresponding to the first message and the portion of the information corresponding to the second message.

3. The field device of claim 1, wherein the communications unit is configured to output a message-received notification, the message-received notification configured to cause the processor to invoke an interrupt service routine to retrieve at least one of the first and second message objects from the communications unit via the second communications protocol.

4. The field device of claim 3, wherein the communications unit is configured to determine whether to output the message-received notification based on an error status of an active one of the first and second message objects.

5. The field device of claim 4, wherein the communications unit is configured to determine to output the message-received notification based on determining that the error status of an active one of the first and second field message objects comprises a non-fatal error status.

6. The field device of claim 4, wherein the communications unit is configured to determine to refrain from outputting the message-received notification based on determining that the error status of an active one of the first and second message objects comprises a fatal error status.

7. The field device of claim 3, wherein the communications unit is configured to output the message-received notification to the processor in response to receiving a complete message over the industrial process network.

8. The field device of claim 7, wherein the communications unit is configured to store the second message in the second message buffer in response to determining that the message-received notification has not been acknowledged by the processor.

9. The field device of claim 3,
wherein the communications unit is connected to the processor via an interrupt terminal; and
wherein the communications unit is configured to output the message-received notification by adjusting a voltage on the interrupt terminal.

10. The field device of claim 1, wherein the communications unit comprises:
a transmit buffer configured to store a message object corresponding to a message received by the communications unit from the processor via the second communications protocol, the message object including message received from the processor and information corresponding to message received from the processor; and
wherein the communications unit is configured to transmit the message object over the industrial process network via the first communications protocol.

11. The field device of claim 10,
wherein the transmit buffer is configured to store a complete message to be transmitted over the industrial process network; and
wherein the communications unit is configured to transmit the complete message over the industrial process network in response to receiving the complete message from the processor.

12. The field device of claim 1,
wherein the first communications protocol comprises a Highway Addressable Remote Transducer (HART) protocol; and
wherein the second communications protocol comprises a Serial Peripheral Interface (SPI) protocol.

13. A communications unit configured to send and receive data over an industrial process network, the communications unit comprising:
a first communications interface configured to send and receive the data over the industrial process network via a first communications protocol at a first data rate;
a second communications interface configured to communicate with a processor via a second communications protocol at a second data rate that is greater than the first data rate;
a first receive buffer configured to store a first message object corresponding to a first message received over the industrial process network; and
a second receive buffer configured to store a second message object corresponding to a second message received over the industrial process network;
wherein the communications unit is configured to connect with the processor via an interrupt terminal; and
wherein the communications unit is configured to output a message-received notification to the processor via the interrupt terminal in response to receiving a complete message over the industrial process network, the message-received notification configured to cause the processor to retrieve at least one of the first and second message objects via the second communications interface.

14. The communications unit of claim 13,
wherein the second communications interface comprises a Master Out Slave In (MOSI) terminal and a Master In Slave Out (MISO) terminal;
wherein the communications unit is configured to receive data from the processor via the MOSI terminal and to transmit data to the processor via the MISO terminal; and
wherein the communications unit is configured to transmit at least one of the first and second message objects via the MISO terminal in response to receiving a message-received acknowledgment via the MOSI terminal.

15. The communications unit of claim 14, wherein the communications unit is configured to store the second message in the second message object buffer in response to determining that the message-received acknowledgment has not been received via the MOSI terminal.

16. The communications unit of claim 14, further comprising:
a transmit buffer configured to store a third message object corresponding to a third message received via the MOSI terminal;
wherein the communications unit is configured to transmit the third message object over the industrial process network via the first communications interface.

17. The communications unit of claim 16, wherein the communications unit is configured to transmit the third message object via the first communications interface in response to determining that the third message object represents a complete message.

18. A method of sending and receiving data over an industrial process network, the method comprising:
receiving, by a communications unit of a field device, a first message via a first communications protocol at a first data rate;
storing, by the communications unit, the first message in a first receive buffer of the communications unit;
determining, by the communications unit, that the first message comprises a complete message according to the first communications protocol;
notifying, by the communications unit in response to determining that the first message comprises a complete message, a processor of the field device that the first message has been received;
sending, by the communications unit, the first message to the processor via a second communications protocol at a second data rate that is greater than the first data rate
receiving, by the communications unit, at least a portion of a second message via the first communications protocol prior to sending the first message to the processor via the second communications protocol; and
storing, by the communications unit, the second message in a second receive buffer of the communications unit.

19. The method of claim 18, wherein notifying the processor that the first message has been received comprises adjusting a voltage of an interrupt terminal that connects the communications unit and the processor.

20. The method of claim 18, further comprising:
receiving, by the communications unit, a third message from the processor via the second communications protocol;
determining, by the communications unit, that the third message comprises a complete message according to the first communications protocol; and
transmitting, by the communications unit, the third message over the industrial process network in response to determining that the third message comprises a complete message.

21. A field device configured to send and receive data over an industrial process network, the field device comprising:
a processor; and
a communications unit communicatively connected to the industrial process network, the communications unit configured to send and receive the data over the industrial process network via a first communications protocol at a first data rate and connected to communicate with the processor via a second communications protocol at a second data rate that is greater than the first data rate;
wherein the communications unit comprises:
a first receive buffer configured to store a first message object corresponding to a first message received by the communications unit over the industrial process network; and
a second receive buffer configured to store a second message object corresponding to a second message received by the communications unit over the industrial process network;
wherein the communications unit is configured to output a message-received notification to the processor in response to receiving a complete message over the industrial process network, the message-received notification configured to cause the processor to invoke an interrupt service routine to retrieve at least one of the first and second message objects from the communications unit via the second communications protocol; and
wherein the communications unit is configured to store the second message in the second message buffer in response to determining that the message-received notification has not been acknowledged by the processor.

* * * * *